(12) United States Patent
Suzuki

(10) Patent No.: US 9,160,135 B2
(45) Date of Patent: Oct. 13, 2015

(54) OPTICAL AMPLIFYING APPARATUS AND OPTICAL TRANSMISSION SYSTEM

(71) Applicant: Furukawa Electric Co., Ltd., Tokyo (JP)

(72) Inventor: Mikiya Suzuki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 57 days.

(21) Appl. No.: 13/872,405

(22) Filed: Apr. 29, 2013

(65) Prior Publication Data

US 2013/0302035 A1 Nov. 14, 2013

Related U.S. Application Data

(63) Continuation of application No. PCT/JP2010/069352, filed on Oct. 29, 2010.

(51) Int. Cl.
*H04B 10/08* (2006.01)
*H01S 3/10* (2006.01)
*H04B 10/079* (2013.01)
*H04B 10/294* (2013.01)
*H04J 14/02* (2006.01)
(Continued)

(52) U.S. Cl.
CPC ........ *H01S 3/10015* (2013.01); *H04B 10/0797* (2013.01); *H04B 10/294* (2013.01); *H04B 10/2912* (2013.01); *H04J 14/0221* (2013.01); *H01S 3/06754* (2013.01); *H01S 3/094007* (2013.01); *H01S 3/1301* (2013.01); *H01S 2301/04* (2013.01)

(58) Field of Classification Search
CPC ................. H04B 10/0731–10/0797; H04B 10/291–10/2972; H01S 3/10007; H01S 3/10015; H01S 3/06708–3/06795
USPC ............. 398/38, 79, 157, 158, 160, 173, 175, 398/180
See application file for complete search history.

(56) References Cited

U.S. PATENT DOCUMENTS 5,727,012 A 3/1998 Baillargeon et al.
5,920,424 A * 7/1999 Espindola et al. ....... 359/337.21
(Continued)

FOREIGN PATENT DOCUMENTS

JP H05-063259 3/1993
JP H09-331118 A 12/1997
(Continued)

OTHER PUBLICATIONS

Ahmad et al: "Broadband amplification of high power 40 Gb/s channels using multimode Er—Yb doped fiber", Optical Express, vol. 18, No. 19, Sep. 13, 2010, pp. 19983-19993.*
(Continued)

*Primary Examiner* — Li Liu
(74) *Attorney, Agent, or Firm* — Thompson Coburn LLP

(57) ABSTRACT

An optical amplifying apparatus that amplifies a wavelength-division multiplexed (WDM) optical signal includes an input section, a laser light source, a double-clad optical fiber, a gain equalizer, and a residual pump light attenuating section that attenuates a residual pump light outputted from the double-clad optical fiber. The residual pump light attenuating section is disposed such that the residual pump light of the laser light is incident on the residual pump light attenuating section before being incident on an isolator.

14 Claims, 11 Drawing Sheets

(51) Int. Cl.
*H04B 10/291* (2013.01)
*H01S 3/067* (2006.01)
*H01S 3/094* (2006.01)
*H01S 3/13* (2006.01)

(56) References Cited

U.S. PATENT DOCUMENTS

| | | | |
|---|---|---|---|
| 6,324,326 B1* | 11/2001 | Dejneka et al. | 385/123 |
| 6,335,821 B1* | 1/2002 | Suzuki et al. | 359/337.11 |
| 6,335,822 B1* | 1/2002 | Toyohara | 359/341.1 |
| 6,344,924 B1* | 2/2002 | Suzuki et al. | 359/337.1 |
| 6,400,497 B1* | 6/2002 | Suzuki et al. | 359/337.11 |
| 6,477,295 B1* | 11/2002 | Lang et al. | 385/31 |
| 6,556,346 B1* | 4/2003 | Di Pasquale et al. | 359/341.5 |
| 6,603,598 B1* | 8/2003 | Oliveti et al. | 359/341.5 |
| 6,690,685 B1* | 2/2004 | Oliveti et al. | 372/6 |
| 6,900,930 B2* | 5/2005 | Ovadia et al. | 359/337 |
| 6,961,502 B1* | 11/2005 | Wysocki et al. | 385/129 |
| 7,437,046 B2* | 10/2008 | DiGiovanni et al. | 385/128 |
| 7,495,825 B2* | 2/2009 | Liu et al. | 359/337.21 |
| 8,027,555 B1* | 9/2011 | Kliner et al. | 385/29 |
| 8,274,732 B2* | 9/2012 | Tamaoki | 359/341.3 |
| 2001/0012147 A1* | 8/2001 | Lutz et al. | 359/337.2 |
| 2001/0022884 A1* | 9/2001 | Bayart et al. | 385/123 |
| 2002/0191276 A1* | 12/2002 | Onaka et al. | 359/341.2 |
| 2003/0063629 A1* | 4/2003 | Davis et al. | 372/6 |
| 2004/0224759 A1 | 11/2004 | Nishimura | |
| 2005/0068610 A1* | 3/2005 | Ossikovski et al. | 359/330 |
| 2007/0081226 A1* | 4/2007 | Sommer et al. | 359/337.1 |
| 2008/0267227 A1* | 10/2008 | Seo et al. | 372/6 |
| 2009/0028193 A1* | 1/2009 | Islam | 372/6 |
| 2009/0154929 A1* | 6/2009 | Yoshida | 398/79 |
| 2009/0225146 A1 | 9/2009 | Yoshimaru | |
| 2010/0210952 A1* | 8/2010 | Taira et al. | 600/476 |

FOREIGN PATENT DOCUMENTS

| | | |
|---|---|---|
| JP | 2000-101173 A | 4/2000 |
| JP | 2001291917 | 10/2001 |
| JP | 2002374024 | 12/2002 |
| JP | 2004047819 | 2/2004 |
| JP | 2005-512332 A | 4/2005 |
| JP | 2007-271786 A | 10/2007 |
| JP | 2007271786 A * | 10/2007 |
| JP | 2008-053294 A | 3/2008 |
| JP | 2008-305840 A | 12/2008 |
| JP | 2009021520 | 1/2009 |
| JP | 2009512182 | 3/2009 |
| JP | 2009-210783 A | 9/2009 |
| JP | 2010-230650 A | 10/2010 |
| JP | 2010-262988 A | 11/2010 |

OTHER PUBLICATIONS

Decision of Refusal received on Jun. 30, 2014 for corresponding Japanese Application No. 2009-110870.
Final Office Action received on Aug. 5, 2013 for corresponding Japanese Application No. 2009-110870.
Office Action received on Mar. 13, 2013 for corresponding Japanese Application No. 2009-110870.
Decision to Grant JP Application No. 2012-540628 dated Oct. 28, 2013.
Ahmad et al., "Broadband Amplification of High Power 40 Gb/s Channels Using Multimode Er—Yb Doped Fiber", Optics Express, 2010, pp. 1-12, vol. 18, No. 19.
International Search Report and Written Opinion and English translation for PCT/JP2010/069352 dated Nov. 30, 2010.
Office Action and English translation for JP Application 2012-540628 dated Jun. 19, 2013.
Office Action received on Feb. 24, 2014 for corresponding Japanese Application No. 2009-110870.
Harun et al, "Dual-stage Er/Yb doped fiber amplifier for gain and noise figure enhancements", IEICE Electronics Express, 2006, pp. 517-521, vol. 3 No. 23.
Dimyati E Al., "Compact and Efficient Er—Yb-Doped Fiber Amplifier", Journal of Nonlinear Optical Physics & Materials, 2008, pp. 193-198, vol. 17 No. 2.
Yahel et al, "Efficiency optimization of high-power, Er3+—Yb3+-codoped fiber amplifiers for wavelength-diversion multiplexing applications", Journal of the Optical Society of America B., Jun. 2003, pp. 1189-1197, vol. 20 No. 6.
Office Action dated Oct. 30, 2014 for corresponding Chinese Patent Application No. 201080069892.0.
Ahmad, et al., "Broadband amplification of high power 40 Gb/s channels using multimode Er—Yb doped fiber", Optics Express, Sep. 13, 2010, vol. 18 No. 19.

* cited by examiner

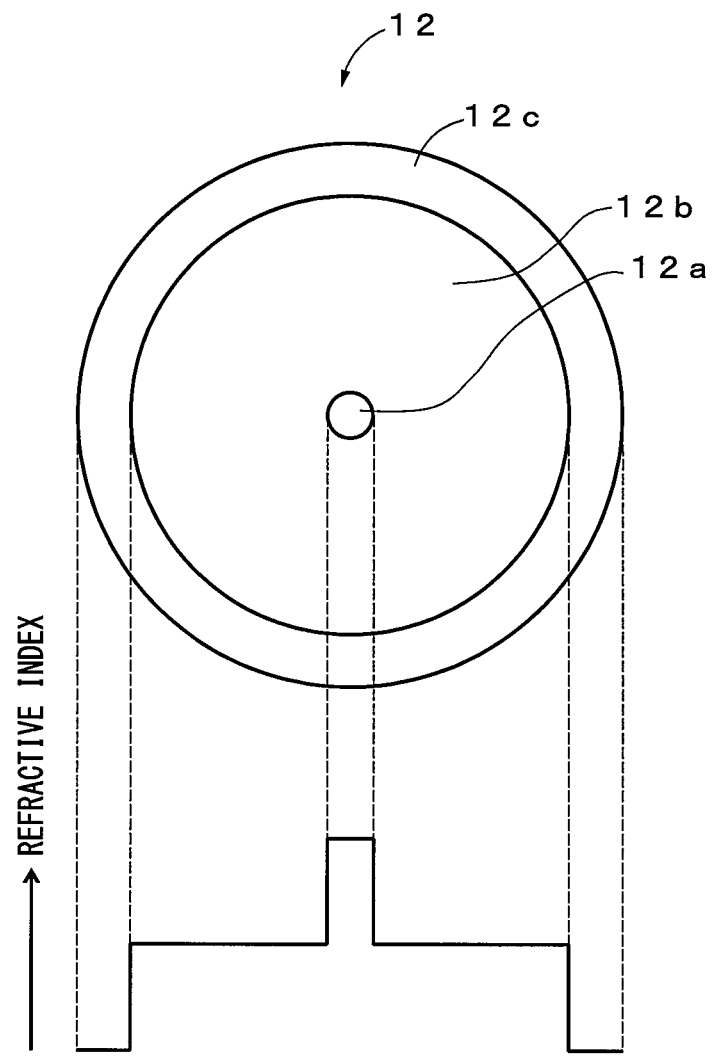
F I G. 2

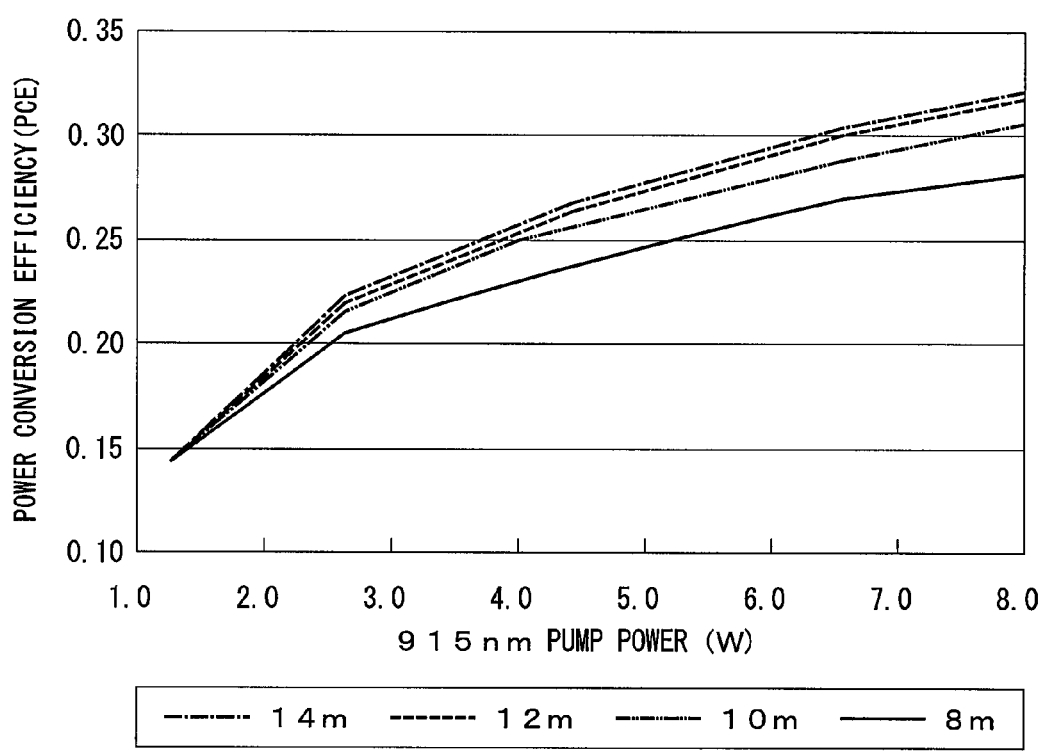
F I G. 3

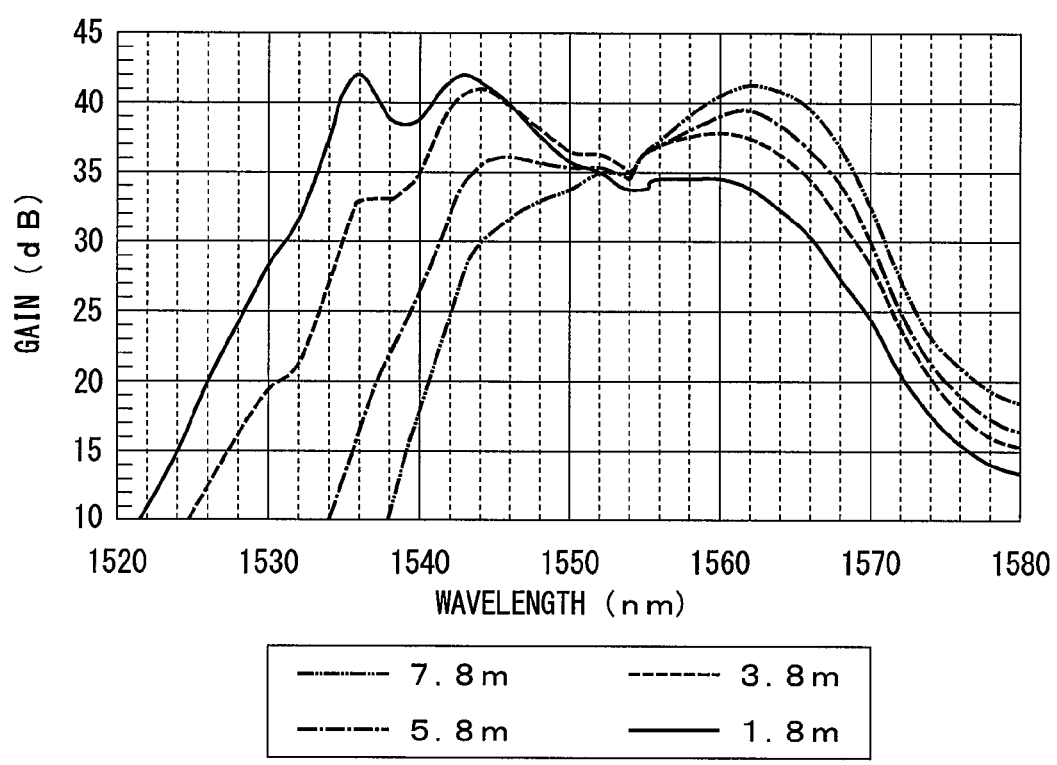
F I G. 4

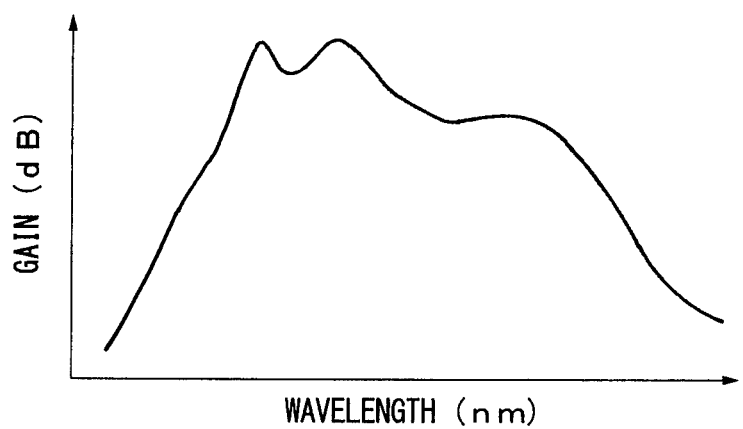
F I G. 5 A
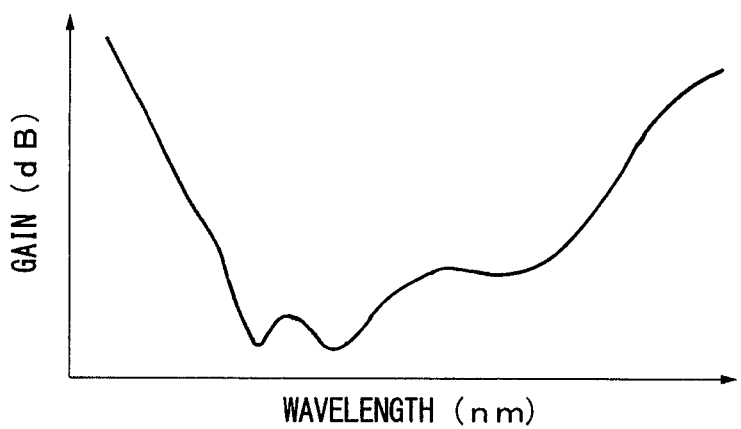
F I G. 5 B
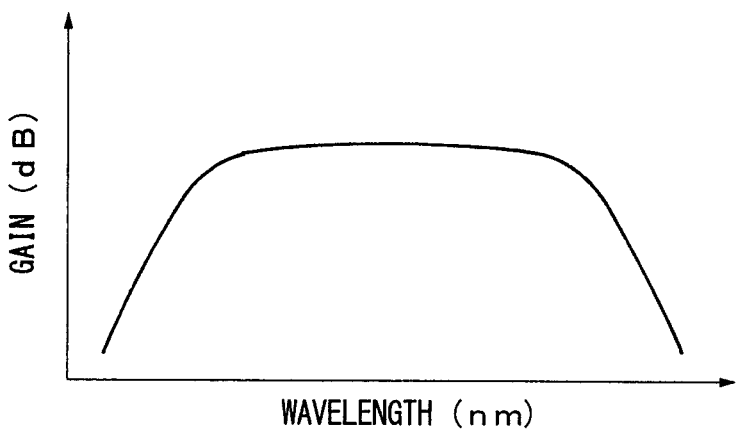
F I G. 5 C

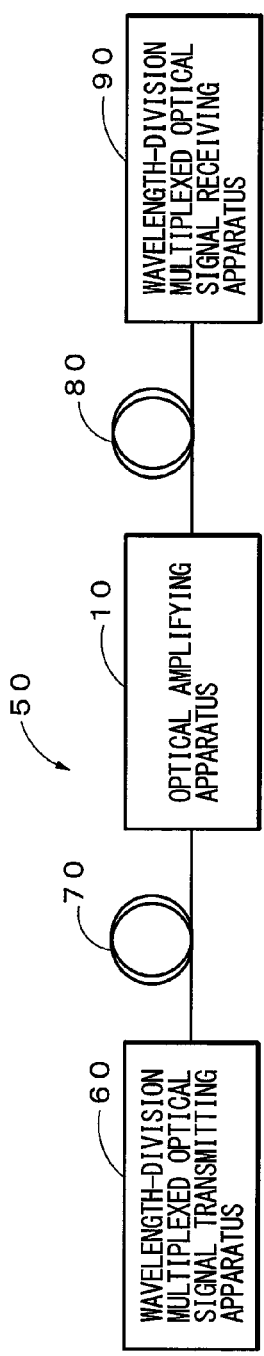
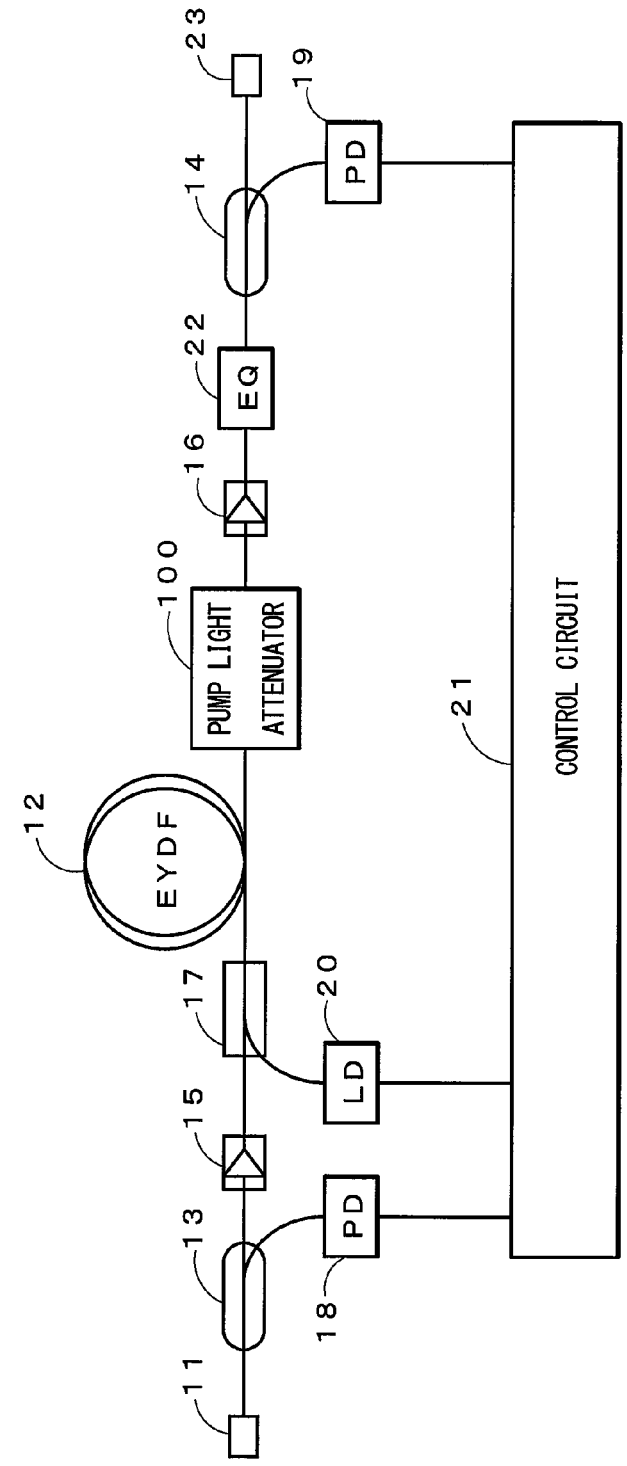
FIG. 6
FIG. 7

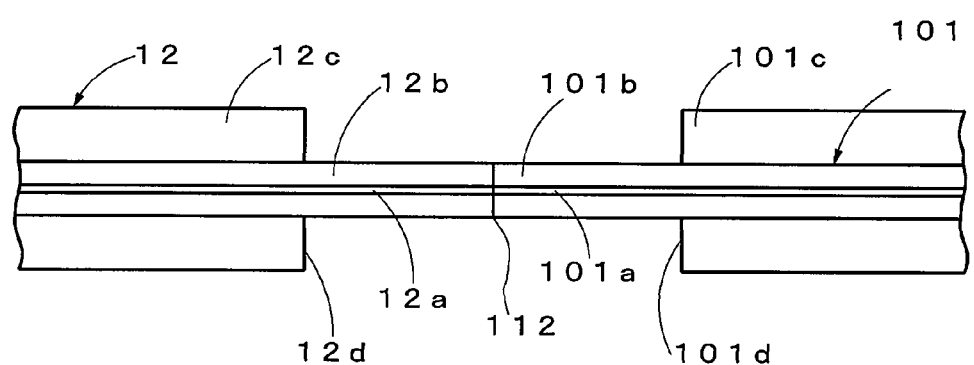
F I G. 8 A
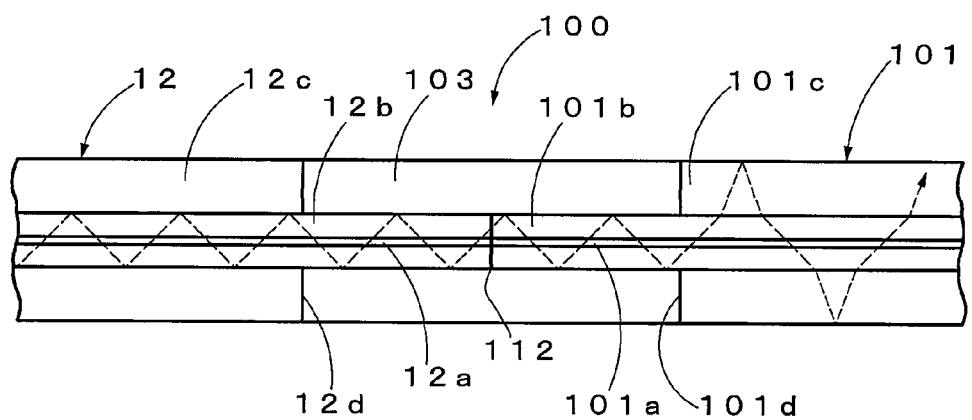
F I G. 8 B

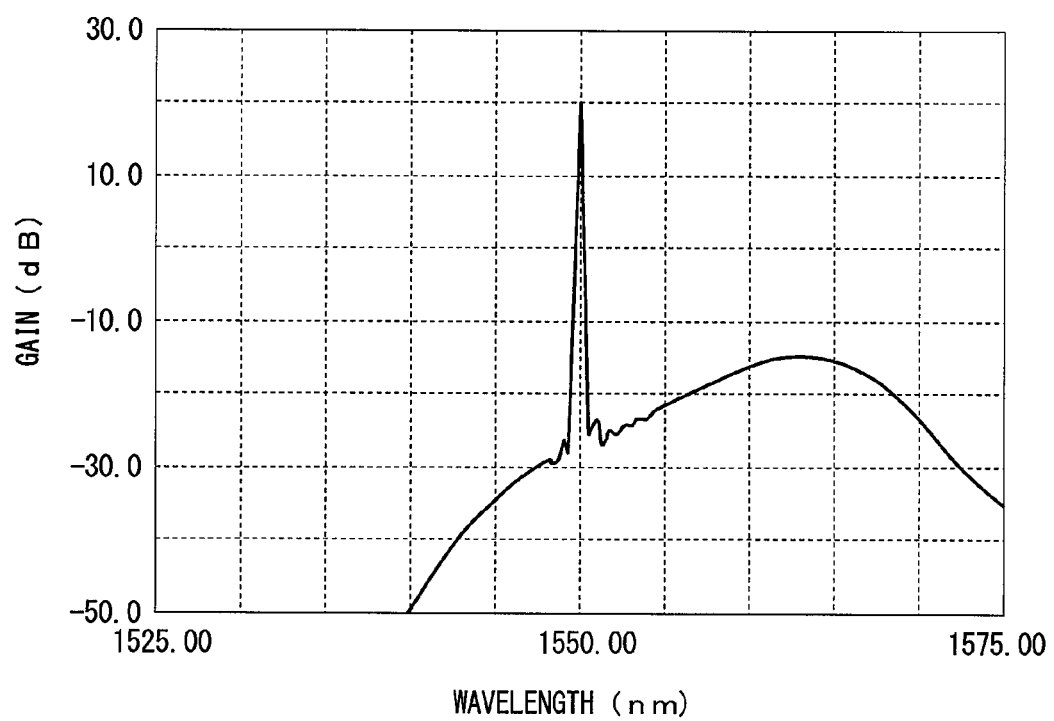
F I G. 1 4

OPTICAL AMPLIFYING APPARATUS AND OPTICAL TRANSMISSION SYSTEM

CROSS REFERENCE TO RELATED APPLICATIONS

This is a continuation application of International Patent Application No. PCT/JP2010/069352, filed Oct. 29, 2010, the full content of which is hereby incorporated by reference herein in its entirety.

TECHNICAL FIELD

The present invention relates to an optical amplifying apparatus and an optical transmission system that are applicable in the field of optical communication or the like.

BACKGROUND ART

Recently, fiber optic communication networks called FTTx (Fiber To The x) such as a fiber optic communication network reaching a user's home are widespread. In such a fiber optic communication network, an optical amplifying apparatus is used for the purpose of compensating for transmission losses in a transmission path and distribution losses in a distributor that distributes optical signals between a plurality of subscribers.

Such an optical amplifying apparatus may be, for example, a known fiber-type optical amplifying apparatus (EDFA: Erbium Doped Fiber Amplifier) that amplifies an optical signal by inputting an optical signal such as a video signal and also inputting a pump light from an optical pump source into an optical fiber having a core portion doped with erbium, which serves as an optical amplification substance. Further, in recent years, it is known to dope the core portion with ytterbium that enables a high-power laser having a watt-class output as an absorption band to be used as an optical pump source. It is also known to use a double-clad optical fiber in which, in order to increase a pump light intensity that can be coupled in a core portion, an optical signal is propagated in a single mode through a core portion and a pump light from a high-power multimode laser light source is propagated in a multimode through a cladding portion surrounding the core portion (see Japanese Laid-Open Patent Publication No. 2008-53294).

An optical amplifying apparatus utilizing an optical fiber doped with erbium and ytterbium is often used for the purpose of amplifying about one or two waves of an optical signal in a 1550-1560 nm band that has a high conversion efficiency in the optical fiber. FIG. 14 is a graph showing amplification characteristics for an output of such an optical amplifying apparatus split into sixteen branches. In FIG. 14, the horizontal axis indicates a wavelength of an optical signal and the vertical axis shows an optical power. This example is an optical spectrum obtained when a signal of 1550 nm was amplified.

The aforementioned optical amplifying apparatus utilizing an optical fiber doped with erbium and ytterbium has been employed in an FTTx system in which signals having a wavelength band of generally 1550-1560 nm are widely used. However, an amplification bandwidth is about 25 nm at the broadest. Therefore, there is a drawback that a bandwidth is rather narrow for collectively amplifying optical signals used in communications that are wavelength division multiplexed (WDM: Wavelength Division Multiplex) and in an entire C-Band (1530-1560 nm).

Accordingly, it is an object of the invention to provide an optical amplifying apparatus that can collectively amplify wavelength-division multiplexed optical signal in a broader band than in the related art.

SUMMARY

In order to achieve the above object, an aspect of the invention is an optical amplifying apparatus that amplifies an wavelength-division multiplexed optical signal, including an input section whereto the wavelength-division multiplexed optical signals are inputted, a laser light source that generates multimode laser light, a double-clad optical fiber having a cladding portion whereto the multimode laser light is inputted and a core portion doped with a rare-earth element whereto the wavelength-division multiplexed optical signal is inputted, the double-clad optical fiber amplifying optical signals of a plurality of wavelengths in the wavelength-division multiplexed optical signals by a stimulated emission by the multimode laser light and outputting the amplified optical signal, a gain equalizer that flattens gain characteristics of the wavelength-division multiplexed optical signal that have been amplified by the double-clad optical fiber, and an output section that outputs the amplified wavelength-division multiplexed optical signal.

With such a structure, the wavelength-division multiplexed optical signal can be amplified collectively.

The optical amplifying apparatus of the aspect of the invention includes, in addition to the aforementioned features, a residual pump light attenuating section that attenuates a residual pump light outputted from the double-clad optical fiber.

With such a structure, an optical component can be prevented from generating heat or being damaged by the residual pump light.

According to the optical amplifying apparatus of the aspect of the invention, in addition to the aforementioned features, the core portion is co-doped with erbium and ytterbium serving as the rare-earth element.

With such a structure, a high-power laser having a watt-order output can be employed as an optical pump source.

According to the optical amplifying apparatus of the aspect of the invention, in addition to the aforementioned features, the double-clad optical fiber has an absorption-length product having a predetermined gain for all the wavelengths constituting the wavelength-division multiplexed optical signal, the absorption-length product being represented by a product of a length of the optical fiber and a peak value of an absorption coefficient in a predetermined wavelength band.

With such a structure, by appropriately setting the absorption-length product and slightly compromising a frequency band showing a highest conversion efficiency when the absorption-length product is sufficient, a gain can be obtained for optical signals of all wavelengths constituting the wavelength-division multiplexed optical signal.

According to the optical amplifying apparatus of the aspect of the invention, in addition to the aforementioned features, the wavelength-division multiplexed optical signal is within a wavelength band of 1528-1570 nm.

With such a structure, the wavelength-division multiplexed optical signal in the C-Band can be amplified collectively.

According optical amplifying apparatus of the aspect of the invention, in addition to the aforementioned features, the multimode laser light is within a wavelength range of 910-960 nm.

With such a structure, various multimode laser light sources can be used.

According to the optical amplifying apparatus of the aspect of the invention, in addition to the aforementioned features, the double-clad optical fiber is configured in such a manner that an absorption-length product of the core portion of erbium is less than or equal to about 300 dB for a wavelength near 1535 nm.

With such a structure, a predetermined gain can be provided for optical signals of all the wavelengths.

According to the optical amplifying apparatus of the aspect of the invention, in addition to the aforementioned features, the double-clad optical fiber is configured in such a manner that an absorption-length product of the core portion of erbium is within a range of about 30-150 dB for a wavelength near 1535 nm.

With such a structure, for example, a predetermined gain can be provided for optical signals of all the wavelengths constituting the wavelength-division multiplexed optical signal in the C-Band and an amplification efficiency can be improved.

According to the optical amplifying apparatus of the aspect of the invention, in addition to the aforementioned features, the double-clad optical fiber is configured in such a manner that an absorption-length product of the cladding portion of ytterbium is less than or equal about 20 dB for a wavelength near 915 nm.

With such a structure, a predetermined gain can be provided for optical signals of all the wavelengths.

According to the optical amplifying apparatus of the aspect of the invention, in addition to the aforementioned features, the double-clad optical fiber is configured in such a manner that an absorption-length product of the cladding portion of ytterbium is within a range of generally 0.9-9.5 dB for a wavelength near 915 nm.

With such a structure, for example, a predetermined gain can be provided for optical signals of all the wavelengths constituting the wavelength-division multiplexed optical signal in the C-Band and an amplification efficiency can be improved.

According to another aspect of the invention, an optical transmission system includes a light transmitting apparatus that transmits wavelength-division multiplexed optical signal, an optical amplifying apparatus that amplifies the wavelength-division multiplexed optical signal, including an input section whereto wavelength-division multiplexed optical signal are inputted, a laser light source that generates multimode laser light, a double-clad optical fiber having a cladding portion whereto the multimode laser light is inputted and a core portion doped with a rare-earth element whereto the wavelength-division multiplexed optical signal is inputted, the double-clad optical fiber amplifying optical signals of a plurality of wavelengths in the wavelength-division multiplexed optical signal by a stimulated emission by the multimode laser light and outputting the amplified optical signals, a gain equalizer that flattens gain characteristics of the wavelength-division multiplexed optical signal that have been amplified by the double-clad optical fiber, an output section that outputs the amplified wavelength-division multiplexed optical signal, and a residual pump light attenuating section that attenuates a residual pump light outputted from the double-clad optical fiber, the residual pump light attenuating section being disposed in such a manner that the residual pump light of the multimode laser light which has propagated through the double-clad optical fiber is incident on the residual pump light attenuating section before being incident on an isolator, and a light receiving apparatus that receives the wavelength-division multiplexed optical signal amplified by the optical amplifying apparatus.

With such a structure, a communication quality of the transmission system can be improved and the cost required for the maintenance of the system can be saved by reducing power consumption.

With an optical amplifying apparatus and an optical transmission system of the present invention, a wavelength-division multiplexed optical signal can be amplified collectively.

BRIEF DESCRIPTION OF DRAWINGS

FIG. 2 is a diagram showing a cross-sectional structure of an amplification optical fiber shown in FIG. 1 and a refractive index of each portion.

FIG. 3 is a diagram showing a relationship between an intensity of pump light and a conversion efficiency when a length of an amplification optical fiber is changed.

FIG. 4 is a diagram showing a relationship between a wavelength and a gain of an optical signal when the length of the amplification optical fiber is changed between 1.8-7.8 m.

FIGS. 5A to 5C are graphs for explaining an operation of a gain equalizer.

FIG. 6 is a diagram showing an exemplary configuration of an optical transmission system in which an optical amplifying apparatus of the present embodiment is employed.

FIG. 7 is a block diagram showing an exemplary configuration of an optical amplifying apparatus of a second embodiment of the invention.

FIG. 8A is a diagram showing a detailed exemplary configuration of components of a pump light attenuating section shown in FIG. 7, but with at least one component missing.

FIG. 8B is a diagram showing a detailed exemplary configuration of a pump light attenuating section shown in FIG. 7.

FIG. 14 is a graph showing a relationship between a wavelength and a gain of an optical signal split in 16 branches for a case where the length of the attenuation optical fiber is 12 m.

DESCRIPTION OF THE PREFERRED EMBODIMENTS

An embodiment of the present invention will now be described.

(A) Configuration of First Embodiment

Figure 1:
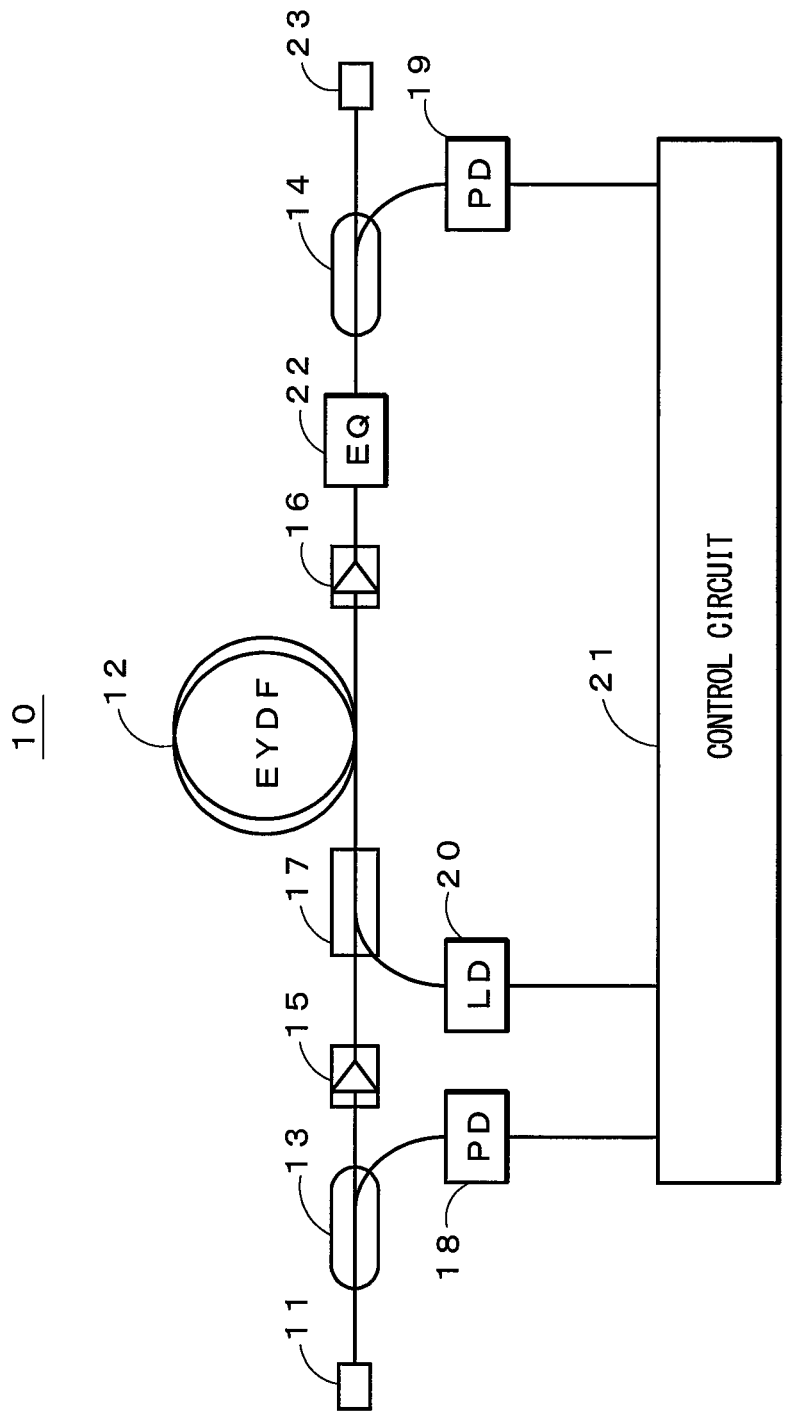
FIG. 1 is a block diagram showing an exemplary configuration of an optical amplifying apparatus of a first embodiment of the invention.

FIG. 1 is a diagram showing an exemplary configuration of an optical amplifying apparatus of a first embodiment of the invention. As shown in FIG. 1, an optical amplifying apparatus 10 includes an input port 11, an amplification optical fiber 12, optical couplers 13 and 14, optical isolators 15 and 16, a pump light mixer 17, photodiodes 18 and 19, a laser diode 20, a control circuit 21, a gain equalizer 22 and an output port 23.

The input port 11 is, for example, an optical connector or the like, and, for example, wavelength-division multiplexed optical signal inputted thereto in the C-Band having a wavelength band of 1530-1560 nm is inputted. The amplification optical fiber (EYDF: Erbium Ytterbium Doped Fiber) 12 amplifies the wavelength-division multiplexed optical signal by a stimulated emission caused by a pump light generated by the laser diode 20.

FIG. 2 is a diagram showing a cross-sectional structure of the amplification optical fiber 12 and a refractive index of each portion. As shown in FIG. 2, the amplification optical fiber 12 is a double-clad optical fiber having a core portion 12a, a first cladding portion 12b and a second cladding portion 12c. As shown at a bottom part of FIG. 2, the core portion 12a, the first cladding portion 12b and the second cladding portion 12c have refractive indices that are in this order from the highest to the lowest. The optical signal propagates through the core portion 12a in a single mode and the pump light from the laser diode 20 propagates through the core portion 12a and the first cladding portion 12b in a multimode. The core portion 12a is, for example, made of silica glass and co-doped with erbium (Er) and ytterbium (Yb). The first cladding portion 12b is, for example, made of silica glass. The second cladding portion 12c is, for example, made of resin, silica glass or the like. An absorption-length product represented by a product of a fiber length of the amplification optical fiber 12 and a peak value of an absorption coefficient for a predetermined wavelength (an absorption coefficient of the invention represents an absorptance at an excitation wavelength and more specifically refers to a component that takes part in the excitation of the signal light wavelength) is determined based on requirements described below. FIG. 2 shows an example in which the first cladding portion 12b has a circular cross-section. However, the cross-section is not limited to a circular shape, and may be, for example, a rectangular shape, a triangle shape or a star shape.

The optical coupler 13 splits a part of the optical signal inputted from the input port 11 and inputs the split-off part into the photodiode 18 and the remaining part into the optical isolator 15. The photodiode (PD) 18 converts the optical signal which has been split by the optical coupler 13 into a corresponding electric signal and supplies it to the control circuit 21. In the control circuit 21, the electric signal supplied from the photodiode 18 is converted into an analog signal or a corresponding digital signal to detect a light intensity of the input signal.

The optical isolator 15 has a function of transmitting the light from the optical coupler 13 and blocking the light in the signal frequency band returning from the amplification optical fiber 12 and the pump light mixer 17. The laser diode (LD) 20 is, for example, a multi-mode semiconductor laser device that generates laser light having a wavelength of a 900 nm band and serving as a pump light. The laser diode 20 is a semiconductor laser device of an uncooled type with no Peltier element, which serves as a cooling element. A semiconductor laser device of a cooled type having a Peltier element may also be used.

The pump light generated by the laser diode 20 is inputted into the amplification optical fiber 12 via the pump light mixer 17 and propagates through the core portion 12a and through the first cladding portion 12b in a multimode. The optical signal outputted from the optical isolator 15 is inputted into the amplification optical fiber 12 via the pump light mixer 17 and propagates through the core portion 12a in a single-mode.

The optical isolator 16 has a function of transmitting the light from the amplification optical fiber 12 and blocking the light returning from the optical coupler 14 for the signal frequency band. The optical isolator 16 also has a function of absorbing the light having an excitation wavelength to prevent it from being propagated to a downstream stage. The gain equalizer (EQ) 22 flattens gain-wavelength characteristics of the optical signal amplified by the amplification optical fiber 12. The optical coupler 14 splits a part of the optical signal outputted from the gain equalizer 22, inputs the split-off part into the photodiode 19 and guides the remaining part to the output port 23. The output port 23 is, for example, an optical connector or the like and externally outputs the amplified optical signal.

The control circuit 21 includes, for example, a CPU (Central Processing Unit), a ROM (Read Only Memory), a RAM (Random Access Memory), an A/D (Analog to Digital) conversion circuit and a D/A (Digital to Analog) conversion circuit, and, the CPU performs an arithmetic process using the RAM as a work area in accordance with a program stored in the ROM and controls an operating current of the laser diode 20 based on the signals supplied from the photodiodes 18 and 19 to perform an ALC (Automatic Output Power Level Control) such that an intensity of an optical signal outputted from the optical amplifying apparatus 10 becomes constant or an AGC (Automatic Gain Control) such that the gain becomes constant. The control circuit 21 may be, for example, a DSP (Digital Signal Processor) or the like.

(B) Operation of First Embodiment

Now, an outline of an operation of the first embodiment will be described and then the operation will be described in detail. In the first embodiment, a double-clad amplification optical fiber 12 co-doped with erbium and ytterbium is used and such amplification optical fiber 12 is generally used for amplifying an optical signal of about one or two wavelengths of around 1550-1560 nm. Also, in order to improve a conversion efficiency, it is common to configure the amplification optical fiber 12 to have a length (fiber length) of greater than or equal to 10 m (an absorption-length product for erbium being greater than or equal to 400 dB). FIG. 3 is a diagram showing a relationship between a power of the pump light of 915 nm and a conversion efficiency (PCE: Power Conversion Efficiency) of an optical power of an output signal having a wavelength of 1550 nm for various lengths of the amplification optical fiber. As can be seen in FIG. 3, the conversion efficiency has generally the same characteristics for the cases where the length of the amplification optical fiber 12 is greater than or equal to 10 m (the cases for 10 m, 12 m or 14 m), whereas the conversion efficiency is significantly low for the case of 8 m as compared to the cases of greater than or equal to 10 m.

FIG. 14, which has been described above, shows amplification characteristics after splitting into 16 branches for a case where the length of the amplification optical fiber 12 is 12 m. For cases where the length of the amplification optical fiber 12 is greater than or equal to 10 m, the amplification characteristics become characteristics having an amplification band of about 25 nm around 1550-1560 nm (narrowband).

FIG. 4 is diagram is a diagram showing a relationship between a wavelength and a gain actually measured with a probing method for cases where the length of the amplification optical fiber is changed between 1.8-7.8 m. The probing method is a method of easily and accurately grasping of amplification characteristics for a general case in which the wavelength-division multiplexed signal is inputted, using a few signals. As shown in FIG. 4, as the length of the amplification optical fiber 12 becomes greater, an amplification band on a short wavelength side shifts towards the right (long wavelength side) in the diagram, and characteristics become narrow band characteristics.

Thus, herein, by configuring the double-clad amplification optical fiber 12 co-doped with erbium and ytterbium to have a length shorter than the length (greater than or equal to 10 m) generally used for the amplification of a signal in the 1550 nm band, the amplification characteristics become broadband characteristics (e.g., a broadband of about 33 nm) while slightly compromising characteristics near 1550-1560 nm, which is a band having the highest conversion efficiency for a sufficient length (e.g., greater than or equal to 10 m). Accordingly, for example, a wavelength-division multiplexed optical signal in a C-Band having a wavelength band of 1530-1560 nm can be amplified collectively. It is to be noted that, in this case, in a wavelength band of 1528-1570 nm, a practical gain can be obtained. As a result, the optical amplifying apparatus 10 of the first embodiment is applicable in the field of communications as an optical amplifying apparatus such as a WDM and a DWDM (Dense Wavelength-division Multiplexing), in place of an EDFA (Erbium Doped Fiber Amplifier) of the related art. Also, since a high power multimode laser diode of an uncooled type can be used as the laser diode 20, an electric power consumed by the Peltier element (an electric power of approximately double the electric power necessary for operating the laser diode 20) becomes unnecessary, and a power consumption of the optical amplifying apparatus 10 can be decreased to one-third or less. As an example of power consumption, an example for a one-wave amplifier will be described. An output obtained with the EDFA by using three 400 mW-class cooled-type single-mode LDs is approximately +28.5 dBm and an absolute maximum consumption current is 12.6 A, whereas an output obtained with a double-clad amplifier (clad pump amplifier) by using a single 4 W-class non-cooled type multi-mode LD is +30 dBm and a maximum consumption current is 4.2 A. Further, by omitting a Peltier element serving as a radiator, the size of the overall apparatus can be reduced. Further, since the double-clad amplification optical fiber 12 co-doped with erbium and ytterbium can easily obtain an increased gain, even if the gain is flattened by the gain equalizer 22, amplification can be achieved with a broader band and a higher gain as compared to a case where the wavelength division multiplexed signal is amplified with the EDFA of the related art.

Next, a detailed operation of the first embodiment will be described.

In the first embodiment, a case of amplifying wavelength-division multiplexed optical signal in a C-Band having a wavelength band of 1530-1560 nm will be explained as an example. When the wavelength-division multiplexed optical signal is inputted from the input port 11, the optical coupler 13 splits it and a part of the signal is inputted into the photodiode 18. Specifically, in a case where the optical coupler 13 is a 20 dB coupler (in a case where the split ratio is 1/100), 1/100 of the optical signal is inputted into the photodiode 18 and the remaining part is inputted into the optical isolator 15.

The photodiode 18 converts the inputted optical signal into an electric signal and supplies it to the control circuit 21. After having converted the inputted electric signal into an analog signal or a corresponding digital signal, the control circuit 21 calculates an intensity of the optical signal inputted from the input port 11 based on the obtained data and a split ratio of the optical coupler 13.

The optical signal which has passed through the optical isolator 15 is guided to the pump light mixer 17. The optical signal which has passed through the optical isolator 15 is inputted to the core portion 12a of the amplification optical fiber 12 via the pump light mixer 17 and propagates in the core portion 12a in a single mode. On the other hand, the pump light generated by the laser diode 20 is inputted to the core portion 12a and the first cladding portion 12b of the amplification optical fiber 12 via the pump light mixer 17, and propagates inside the core portion 12a and the first cladding portion 12b in the multi-mode. The pump light is absorbed by an ytterbium ion ($Yb^{3+}$) in the core portion 12a while propagating through the amplification optical fiber 12, and the ytterbium ion indirectly excites an erbium ion ($Er^{3+}$). The optical signal that propagates through the core portion 12a is amplified by a stimulated emission from the excited erbium ion. It is to be noted that, in the present embodiment and the second embodiment to be described below, the pump light power in a multi-mode is around 7 W-21 W.

In a case where the amplification optical fiber 12 has a length of 1.8 m and the optical signal has an intensity of −3 dBm, an amplification characteristic is as shown with a solid line in FIG. 4, and therefore, the wavelength-division multiplexed optical signal in the C-Band having a wavelength band of 1530-1560 nm is amplified based on the gain characteristics shown in FIG. 4. Specifically, amplification is performed with a gain of about 27 dB for the wavelength of 1530 nm and with a gain of about 34 dB for the wavelength of 1560 nm.

The optical signal amplified by the amplification optical fiber 12 is guided to the gain equalizer 22 via the optical isolator 16. In the gain equalizer 22, the flattening of the gain for each wavelength within a target band is performed. FIGS. 5A to 5C are graphs for explaining an outline of an operation of the gain equalizer 22. FIG. 5A is a graph showing a relationship between the wavelength and the gain of the amplification optical fiber 12. It is to be noted that this curve corresponds to the case where the length of the amplification optical fiber 12 is 1.8 m shown in FIG. 4. FIG. 5B is a graph indicating a relationship between the wavelength and the gain of the gain equalizer 22. As shown in this graph, the curve indicating a relationship between the wavelength and the gain of the gain equalizer 22 has a gain characteristic which is opposite to the curve shown in FIG. 5A that indicates the characteristic of the amplification optical fiber 12. FIG. 5C is a graph showing a total gain for the amplification optical fiber 12 and the gain equalizer 22. As shown in FIG. 5C, by passing through both the amplification optical fiber 12 and the gain equalizer 22, the gain becomes constant irrespective of the wavelength. In this manner, by using the gain equalizer 22, the wavelength-division multiplexed optical signal can be amplified with a constant gain irrespective of its wavelength. In the example of FIG. 4, within the range 1530-1560 nm, since the lowest gain is about 27 dB which appears at 1530 nm, the gain for the range of 1530-1560 nm after having passed through the gain equalizer 22 is flattened by taking 27 dB as a reference and becomes about 27 dB irrespective of the wavelength.

The optical signal which has passed through the gain equalizer 22 is inputted into the optical coupler 14. The optical coupler 14 splits a part of the inputted optical signal and the split-off part is inputted to the photodiode 19. Specifically, in a case where the optical coupler 14 is a 20 dB coupler (in a case where the split ratio is 1/100), 1/100 of the optical signal is inputted into the photodiode 19, and the remaining part is guided to the output end 23. The optical signal which has passed through the optical coupler 14 is outputted from the output end 23.

The photodiode 19 converts an inputted optical signal into an electric signal and supplies it to the control circuit 21. After having converted the inputted electric signal into an analog signal or a corresponding digital signal, the control circuit 21 calculates an intensity of the amplified optical signal based on the obtained data and the split ratio of the optical coupler 14. Then, the control circuit 21 determines the gain of the amplification optical fiber 12 based on the intensity of the input light calculated by the aforementioned process and the intensity of the output light. Then, based on the intensity of the output light and the obtained gain, an automatic output power level control (ALC) and an automatic gain control (AGC) are performed which are the controls performed for making the output or the gain constant. Alternatively, the control may be performed based on an automatic current control (ACC) such that the excitation current becomes constant and an Automatic Pump Power Control (APC) such that the pump power becomes constant.

As has been described above, according to the first embodiment of the invention, since the double-clad amplification optical fiber 12 co-doped with erbium and ytterbium is configured to have a length shorter than 10 m, which is a normally used length, and the amplification characteristic is made broadband while compromising the characteristic around 1550-1560 nm where the conversion efficiency is the highest, a wavelength-division multiplexed optical signal, for example, in the C-Band of a wavelength band of 1530-1560 nm can be amplified collectively.

Also, when the laser diode 20 of an uncooled-type is used, the power consumption of the optical amplifying apparatus 10 can be decreased to about one-third since an electric power to be consumed by a Peltier element is eliminated, and an overall size of the apparatus can be reduced since a Peltier element serving as the radiator is eliminated. Of course, a cooled-type laser diode having a Peltier element can be used as the laser diode 20.

In the first embodiment, since the double-clad amplification optical fiber 12 co-doped with erbium and ytterbium is used and such an amplification optical fiber 12 can readily obtain a higher gain, even in a case where the flattening of the gain is performed with the gain equalizer 22, amplification can be achieved with a broader band and a higher gain as compared to the case of the related art in which the gain is obtained with the EDFA.

FIG. 6 is a schematic configuration diagram illustrating a case where the optical amplifying apparatus of the first embodiment is employed in an optical transmission system 50. In an example shown in FIG. 6, the optical transmission system 50 has a wavelength-division multiplexed optical signal transmitting apparatus 60, a transmitting-side optical transmission path 70, the optical amplifying apparatus 10 of the first embodiment, a receiving-side optical transmission path 80 and a wavelength-division multiplexed optical signal receiving apparatus 90. In the present example, a wavelength-division multiplexed optical signal transmitted from the wavelength-division multiplexed optical signal transmitting apparatus 60 propagates through the transmitting-side optical transmission path 70 and reaches the optical amplifying apparatus 10. The wavelength-division multiplexed optical signal is amplified collectively in the optical amplifying apparatus 10 in a manner described above, and then propagates through the receiving-side optical transmission path 80 and arrives at the wavelength-division multiplexed optical signal reception device 90, where the multiplexed signals are separated and each signal is decoded. Since a high gain and a low power consumption can be achieved with the optical amplifying apparatus 10 of the first embodiment, the optical transmission system 50 using such an optical amplifying apparatus 10 can achieve an improved communication quality for the entire system, decrease the power consumption and save expenses required for the maintenance of the system.

(C) Second Embodiment

FIG. 7 is a diagram for explaining an exemplary configuration of the second embodiment. In FIG. 7, features corresponding to those shown in FIG. 1 are indicated with the same reference numerals as in FIG. 1 and explanations will be omitted. As compared to FIG. 1, an optical amplifying apparatus 10A shown in FIG. 7 includes a pump light attenuating section 100 inserted between the amplification optical fiber 12 and the optical isolator 16.

The pump light attenuating section 100 attenuates a residual pump light that is a residual, which was not used in the amplification optical fiber 12 and propagating in the first cladding portion 12b, to prevent optical components from generating heat or being damaged by the residual pump light.

FIGS. 8A and 8B are diagrams showing a detailed exemplary configuration of the pump light attenuating section 100. FIG. 8A shows a state prior to the forming of the pump light attenuating section 100. In the present example, an output-side end portion of the amplification optical fiber 12 and an end portion of the optical fiber 101 which is connected to an input side of the optical isolator 16 are joined by a fusion bond portion 112. More specifically, the amplification optical fiber 12 has a structure in which a second cladding portion 12c is removed for a predetermined length from an end portion with an end surface 12d being a cutting surface, and the optical fiber 101 has a structure in which a coating portion 101c is removed for a predetermined length from an end portion with an end surface 101d being a cutting surface. The core portion 12a and the core 101a, as well as the first cladding portion 12b and the cladding portion 101b, of the amplification optical fiber 12 and the optical fiber 101, respectively, are welded so as to be optically coupled. Accordingly, the optical signal propagates from the core portion 12a to the core 101a and the pump light propagates from the first cladding portion 12b to the cladding portion 101b.

FIG. 8B shows a state in which the pump light attenuating section 100 has been formed. As shown in this diagram, a gap between the end surface 12d of the amplification optical fiber 12 and the end surface 101d of the optical fiber 101 is filled with, for example, a low refractive index polymer 103, which is a member that has a refractive index lower than that of the first cladding portion 12b and the cladding portion 101b. With m being a refractive index of the second cladding portion 12c of the amplification optical fiber 12, $n_2$ being a refractive index of the first cladding portion 12b, $n_3$ being a refractive index of the low refractive index polymer 103, $n_4$ being a refractive index of the cladding portion 101b of the optical fiber 101, $n_5$ being a refractive index of the coating portion 101c, each material is selected such that the refractive indices $n_1$ to $n_5$ satisfy the following relationships:

$$n_1 \approx n_3 < n_2 \tag{1}$$

$$n_2 \approx n_4 \tag{2}$$

$$n_4 < n_5 \tag{3}$$

As shown in FIG. 8B with a broken line, the residual pump light that propagates through the first cladding portion 12b of the amplification optical fiber 12 propagates from the first cladding portion 12b to the cladding portion 101b through a fused portion 112. Here, since the relationship $n_1 < n_2$ holds as expressed in equation (1), the residual pump light that propagates through the first cladding portion 12b in the amplification optical fiber 12 does not leak out from the first cladding portion 12b. Further, since $n_2 \approx n_4$ as expressed in equation (2) and $n_3 < n_2$ as expressed in equation (1), a relationship $n_3 < n_2 \approx n_4$ holds. Therefore, the residual pump light that propagates through the first cladding portion 12b and the cladding portion 101b in a low refractive index polymer 103 does not leak out. On the other hand, since $n_4 < n_5$ as expressed in equation (3), the residual pump light that propagates through the cladding portion 101b in the optical fiber 101 leaks from the cladding portion 101b into the coating portion 101c, and a part of the leaked-out residual pump light is converted into heat in the coating portion 101c and a part of the leaked-out residual pump light is released out of the coating portion 101c. Therefore, the residual pump light attenuates as it propagates through the cladding portion 101b in the optical fiber 101. It is preferable that a member for transmitting the residual pump light to a heat sink or the like is added to an outer peripheral portion of the coating portion 101c. With to such a structure, the heat generated in the coating portion 101c can be rapidly released outside.

Now, an operation of the second embodiment will be described. The basic operation of the second embodiment is similar to that of the first embodiment shown in FIG. 1. However, in the second embodiment, the residual pump light that is a residual which was not used in the amplification optical fiber 12 is attenuated in the pump light attenuation portion 100. Herein, since the amplification characteristic has a broader band by making the length of the amplification optical fiber 12 shorter than the length normally used for amplifying the signal in the 1550 nm band, a residual pump light having an intensity higher than usual is generated. Here, the optical isolator 16 is constituted, for example, using a magnetic garnet, and the magnetic garnet has an absorption characteristic for the 900 nm band (a band of around 900-965 nm), which is a wavelength of the excitation light. Therefore, without a pump light attenuating section 100, since the residual pump light having an intensity higher than normal is incident on the optical isolator 16 and absorbed, heat will be produced and may damage the optical isolator 16. However, with the pump light attenuating section 100 being provided, since the residual pump light can be attenuated to less than or equal to 500 mW, which is proof stress for the optical component, the optical isolator 16 can be prevented from generating heat or being damaged. In the above description, the residual pump light is attenuated to less than or equal to 500 mW, which is a proof stress of the optical component, but may, for example, be attenuated to be equivalent to or below an intensity of the optical signal that propagates through the core.

As has been described above, according to the second embodiment of the invention, since the residual pump light outputted from the amplification optical fiber 12 is attenuated by the pump light attenuating section 100 provided between the amplification optical fiber 12 and the optical isolator 16, optical components such as the optical isolator 16 arranged at a stage downstream of the amplification optical fiber 12 can be prevented from generating heat or being damaged by the residual pump light.

(D) Third Embodiment

Figure 9:
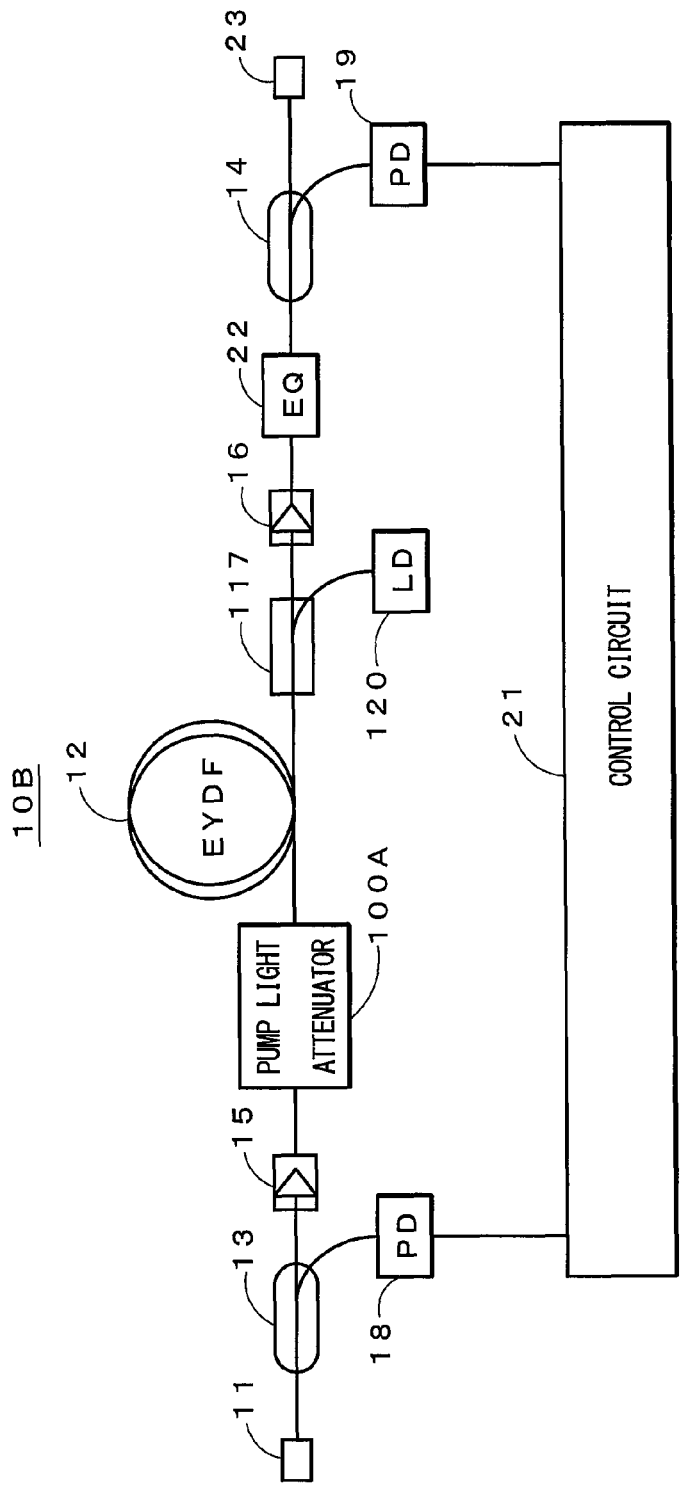
FIG. 9 is a block diagram showing an exemplary configuration of an optical amplifying apparatus of a third embodiment of the invention.

FIG. 9 is a diagram showing an exemplary configuration of a third embodiment. In FIG. 9, features corresponding to those shown in FIG. 1 are indicated with the same reference numerals as in FIG. 1 and explanations will be omitted. As compared to FIG. 1, an optical amplifying apparatus 10B shown in FIG. 9 has no laser diode 20 for forward excitation and no pump light mixer 17, and includes a laser diode 120 for backward excitation and a pump light mixer 117 added between the amplification optical fiber 12 and the optical isolator 16. Further, a pump light attenuating section 100A is added between the optical isolator 15 and the amplification optical fiber 12. The laser diode 120 and the pump light mixer 117 have configurations similar to those of the laser diode 20 and the pump light mixer 17, respectively, and the pump light attenuation portion 100A has a configuration which is a horizontally reversed structure of the pump light attenuation portion 100 shown in FIG. 8 rotated about the fused portion 112. The optical fiber 101 is an optical fiber connected to an output side of the optical isolator 15.

Next, an operation according the third embodiment will be described. The basic operation of the third embodiment is similar to that of the second embodiment shown in FIG. 8, except that the third embodiment is of a backward excitation type whereas the second embodiment is of a forward excitation type. That is to say, in the third embodiment, a pump light of about 9 W to 14 W is emitted from the laser diode 120, and the emitted pump light is incident on an output end of the amplification optical fiber 12 via the pump light mixer 117. The pump light which was not used in the amplification optical fiber 12 is outputted as a residual pump light from the input end of the amplification optical fiber 12 (light-hand side in FIG. 9). Such residual pump light is attenuated in the pump light attenuating section 100A, and attenuated to a high-power light proof stress or less of the optical component (e.g., 500 mW or less) or is attenuated to be equivalent or less than an optical signal incident to the optical isolator 15. Therefore, optical components such as the optical isolator 15 can be prevented from generating heat or being damaged by the residual pump light.

(E) Fourth Embodiment

Figure 10:
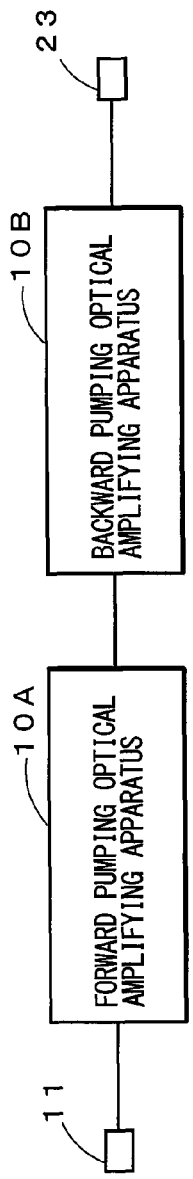
FIG. 10 is a block diagram showing an exemplary configuration of an optical amplifying apparatus of a fourth embodiment of the invention.

FIG. 10 is a diagram for explaining an exemplary configuration of a fourth embodiment. In the fourth embodiment, the forward excitation-type optical amplifying apparatus 10A shown in FIG. 7 with the output port 23 being omitted and the backward excitation-type optical amplifying apparatus 10B shown in FIG. 9 with the input port 11 being omitted are connected in a cascade (series).

Next, an operation of the fourth embodiment will be described. Operations of the forward excitation type optical amplifying apparatus 10A and the backward excitation type optical amplifying apparatus 10B constituting the fourth embodiment are similar to those mentioned above. In the fourth embodiment, the forward excitation type optical amplifying apparatus 10A having an improved noise characteristic is arranged at an upstream stage to amplify an optical signal with a predetermined gain and the backward excitation type optical amplifying apparatus 10B having improved a high power characteristic is arranged at a downstream stage to perform an amplification to reach a predetermined power. It is to be noted that, in each optical amplifying apparatus, as has been described above, in the pump light attenuating section 100 (or the pump light attenuating section 100A), since the residual pump light is attenuated to less than or equal to 500 mW or equivalent to or below the optical signal, an optical component such as the optical isolator arranged at a stage downstream thereof can be prevented from generating heat or being damaged.

In the above-mentioned fourth embodiment, the gain equalizer 22 is provided in each amplifying apparatus, but may be, for example, provided in one of the forward excitation type optical amplifying apparatus 10A and the backward excitation type optical amplifying apparatus 10B, or may be provided at a stage upstream of the amplification optical fiber 12 of the forward excitation type optical amplifying apparatus 10A. In the case of providing in one of them, the characteristic may be set in such a manner that the gain characteristics of optical signals of a plurality of wavelengths contained in the wavelength-division multiplexed optical signals outputted from the backward excitation type optical amplifying apparatus 10B are flattened (the intensity of the optical signal of each wavelength becomes equal).

(F) Fifth Embodiment

Figure 11:
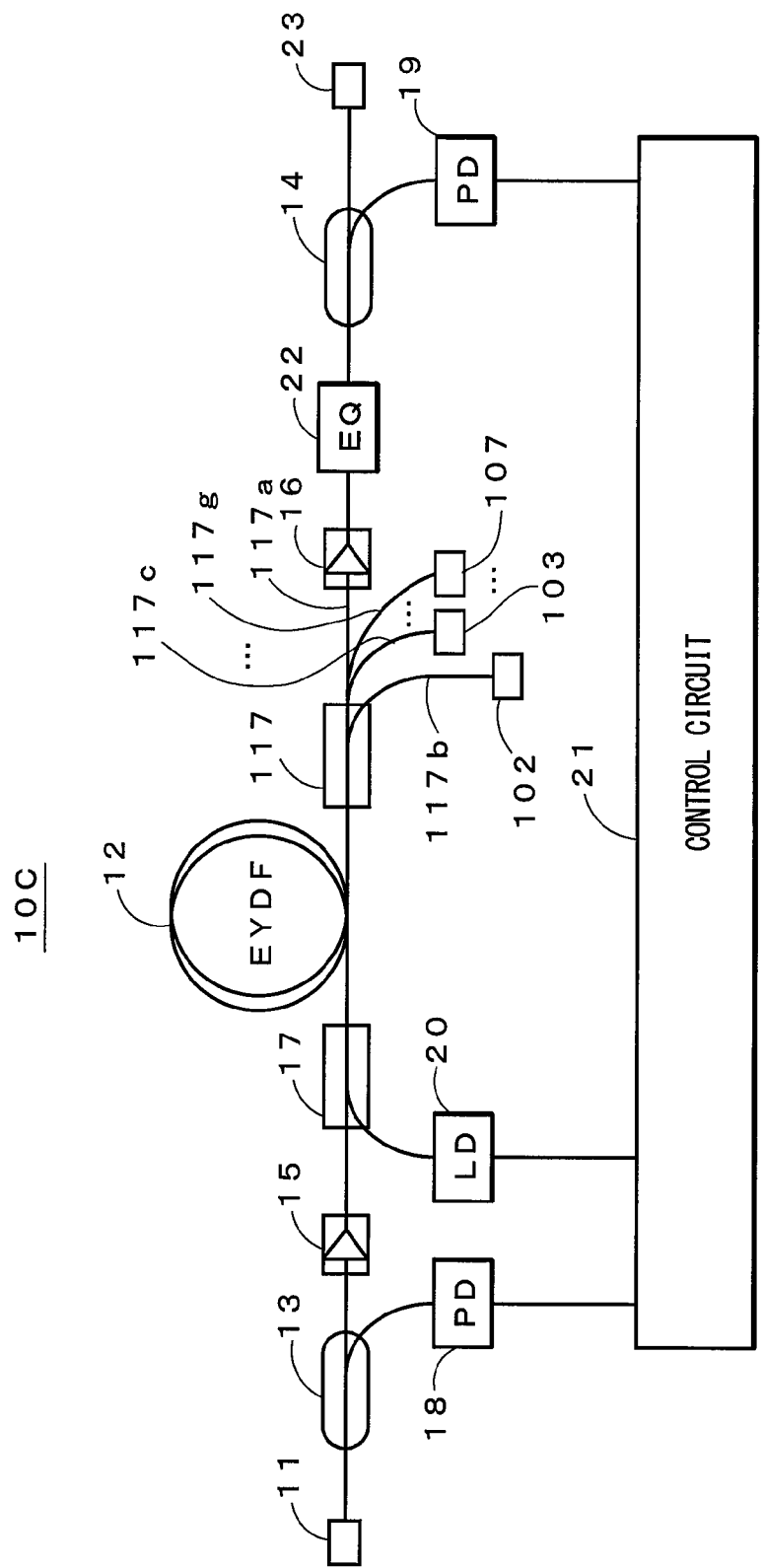
FIG. 11 is a block diagram showing an exemplary configuration of an optical amplifying apparatus of a fifth embodiment of the invention.

FIG. 11 is a diagram showing an exemplary configuration of the fifth embodiment. In FIG. 11, features corresponding to those shown in FIG. 1 are indicated with the same reference numerals as in FIG. 1 and explanations will be omitted. As compared to FIG. 1, an optical amplifying apparatus 10C shown in FIG. 11 has a pump light mixer 117 added thereto. Further, pump light attenuating sections 102-107 are connected to output ends 117b-117g of the residual pump light of the pump light mixer 117, respectively. Other structures are similar to those shown in FIG. 1. With regards to the pump light mixer 117, similarly to FIG. 9, those used for introducing the pump light into the amplification optical fiber 12 is used for deriving and attenuating the residual pump light in the fifth embodiment.

Figure 12:
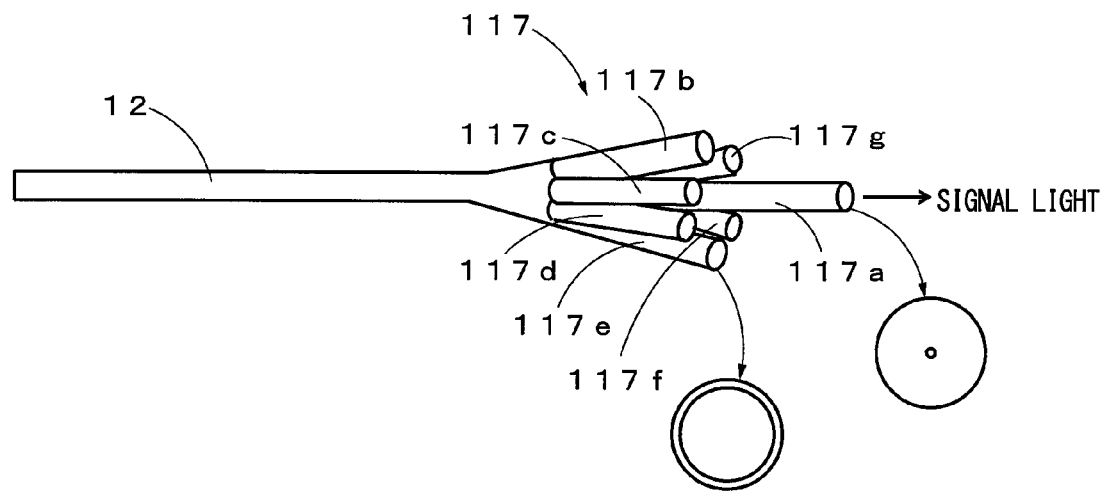
FIG. 12 is a diagram showing an exemplary configuration of a pump light mixer shown in FIG. 11.

FIG. 12 shows a detailed exemplary configuration of the pump light mixer 117. In this example, the pump light mixer 117 has an output end 117a from which an optical signal is outputted and output ends 117b-117g from which a residual pump light is outputted. The optical signal propagating the core portion 12a of the amplification optical fiber 12 is outputted from an output end 117a and is inputted to the isolator 16. The residual pump light outputted by the first cladding portion 12b of the amplification optical fiber 12 is outputted from the output ends 117b-117g. As shown in the figure with an enlarged view showing a cross section, the output end 117a is configured as a single-mode fiber and the output end 117b-117g are configured as a multi-mode fiber. In the example of FIG. 11, the pump light attenuation portions 102-107 for attenuating the residual pump light from the laser diode 20 are connected to the output ends 117f-117g, respectively.

Figure 13:
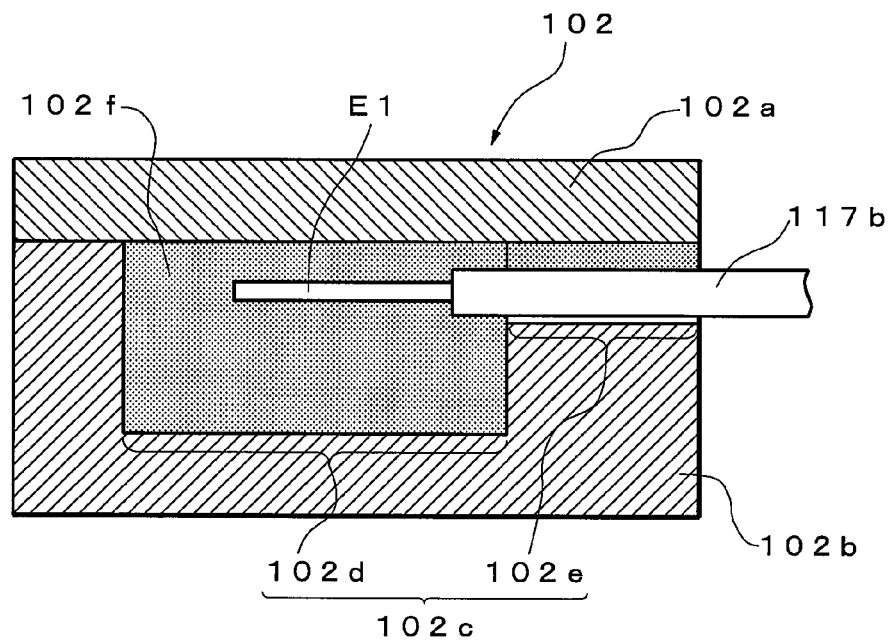
FIG. 13 is a diagram showing an exemplary configuration of a pump light attenuating section shown in FIG. 11.

FIG. 13 is a side cross-section schematic diagram showing an exemplary configuration of the pump light attenuating sections 102-107 shown in FIG. 11. Since the pump light attenuating sections 102-107 have similar configurations, the pump light attenuation portion 102 will be taken as an example for explanation. As shown in FIG. 13, the pump light attenuating section 102 has a heat dissipating plate 102b in which a groove 102c for accommodating a terminating portion E1 of an output end 117b and an optical fiber coating portion in the vicinity thereof is formed, high refractive index polymer 102f and a cover 102a that covers the groove 102c. The terminating portion E1 of the output end 117b is a bare fiber portion exposed by removing the second cladding portion from the output end 117b.

The heat dissipating plate 102b absorbs the residual pump light leaking from the terminating portion E1 accommodated inside the groove 102c and converts it into heat, and dissipates the heat due to the residual pump light to the exterior. A metal member forming the heat dissipating plate 102b has a high thermal conductivity and, for example, which is a metal member including at least one of aluminum, copper, iron and the nickel. As an example, the metal member may include stainless steel.

The groove 102c formed in the heat dissipating plate 102b has an accommodating groove 102d that accommodates the terminating portion E1 and a supporting groove 102e that supports an optical fiber coating portion disposed in the vicinity of the terminating portion E1. Specifically, the supporting groove 102e is formed at an edge portion of the heat dissipating plate 102b and supports the optical fiber coating portion in the vicinity of the terminating portion E1 when the terminating portion E1 is accommodated in the accommodation groove 102d. On the other hand, the accommodating groove 102d is formed in a region inside an edge of heat dissipating plate 102b and accommodates at least the terminating portion E1. Such an accommodation groove 102d has a deeper bottom and a greater width as compared to the support groove 102e. In this case, the terminating portion E1 can be accommodated without coming into contact with an inner wall of the accommodating groove 102d. It is to be noted that the inner wall of accommodating groove 102d is colored with a color (for example, black) that easily absorbs light. Thereby, the heat dissipating plate 102b can efficiently absorb the residual pump light from the terminating portion E1.

Further, a high refractive index polymer 102f of the pump light attenuating section 102 covers the terminating portion E1 accommodated in the accommodation groove 102d and the optical fiber coating portion disposed in the supporting groove 102e, secures the terminating portion E1 in the accommodation groove 102d, and secures the optical fiber coating portion in the support groove 102e. The high refractive index polymer 102f has a refractive index that is higher than that of the cladding of the output end 117b at the terminating portion E1. Therefore, the residual pump light that propagates through the terminating portion E1 propagates from the terminating portion E1 to the high refractive index polymer 102f. As a result, the residual pump light is emitted from the terminating portion E1 and absorbed by the heat dissipating plate 102b and the cover 102a.

The cover 102a is made of, for example, a metal member including at least one of aluminum, copper, iron and the nickel. One of the examples may be stainless steel. A surface of the cover 102a on a side opposing the accommodating groove 102d is preferably colored with a color (for example, black) that easily absorbs light. Thereby, the cover 102a can efficiently absorb the residual pump light excluded from the terminating portion E1.

Also, each of the pump light attenuating sections 103-107 has a configuration similar to that of the pump light attenuating section 102.

Next, an operation of the fifth embodiment will be described. In the fifth embodiment, a part of the pump lights outputted from the laser diode 20 that was not used in the amplification optical fiber 12 and became the residual pump light is incident on the pump light attenuation portions 102-107 via the output ends 117b-117g, converted into heat and attenuated. Therefore, an optical component such as an optical isolator 16 can be prevented from generating heat, etc., due to the residual pump light outputted from the amplification optical fiber 12. Thus, in the fifth embodiment, since those the part that was not used in the amplification optical fiber 12 and became the residual pump light is converted into heat by the pump light attenuation portions 102-107 connected to the output ends 117f-117g, an optical component such as the optical isolator 16 can be prevented from generating heat or being damaged by the residual pump light.

In the above description, the pump light mixer 117 has six output ends 117b-117g for the residual pump light, but the number is not limited thereto.

(G) Variant Embodiment

In each of the aforementioned embodiments, for the wavelength-division multiplexed optical signal in a C-Band in which a wavelength band is 1530-1560 nm, a predetermined gain can be obtained for each wavelength constituting the optical signal by setting a length of the amplification optical fiber 12 to generally less than or equal to 8 m, and more preferably, to a range of generally 1.8-3.8 m. In this case, for erbium, which is a main dopant, and a wavelength of near 1535 nm of signal light propagating in the core, an absorption-length product is generally 300 dB when the fiber length is 8 m, and generally in a range of 30-150 dB when the fiber length is 1.8-3.8 m. For ytterbium, which is added for erbium for creating an inverted distribution between levels of erbium using an energy transfer phenomenon and for a pump light near 915 nm, an absorption-length product in the core of the ytterbium when the fiber length is 8 m is generally 3100 dB, and, the absorption-length product of the core of 1.8-3.8 m is generally in the range of 180-1500 dB. Therefore, in a case where densities of the dopants are different, an amplification characteristic similar to that of the aforementioned case can be obtained by setting the length of the amplification optical fiber 12 in such a manner that the aforementioned absorption-length product is obtained. When setting the absorption-length product or the length of the amplification optical fiber 12, they should be set in such a manner that a desired gain (e.g., 30 dB) is obtained in at a wavelength at which the gain is assumed to give be the lowest with a conventional configuration (e.g., 1530 nm in the case of C-Band). This is because, with a conventional configuration, if a desired gain can be obtained at a wavelength at which the gain is the lowest, a desired gain can be achieved for other wavelengths even after having passed through the gain equalizer 22. Alternatively, the length (or the absorption-length product) may be set to a length in which a gain on a short-wavelength side and a gain on a long-wavelength side can be balanced such that a wavelength band in which the desired gain can be obtained becomes the broadest. Also, here, the absorption-length product of ytterbium may set at a value at the core as described above (a value for a pump light propagating the core) or may be set at a value for the cladding propagating light as described below. The value for the cladding propagating light is, similarly to the above, for a pump light of near 915 nm, generally 20 dB for the fiber length of 8 m, and in a range of generally 0.9-9.5 dB for 1.8 m-3.8 m. In the present embodiment, a wavelength of the excitation light is assumed to be 915 nm, but since an absorption-wavelength property of ytterbium is substantially flat in a range of around 910-960 nm, the pump light in this wavelength range can be treated in a similar manner.

Also, in each of the aforementioned embodiments, the cases in which the double-clad amplification optical fiber 12 having a core portion 12a co-doped with erbium and ytterbium was used in the explanation, but a rare-earth element such as thulium (Tm: Thulium), neodymium (Nd: Neodymium), praseodymium (Pr: Praseodymium) or other substances having a similar amplification function as the rare-earth element may be added. In such a case, the amplification band is different from each of the aforementioned embodiments, but an effect similar to the present invention can be obtained.

Also, in each above-mentioned embodiment, the gain equalizer 22 was used, but when a gain by the amplification optical fiber 12 is substantially flat, the gain equalizer 22 can be dispensed with. Alternatively, the gain equalizer 22 may be independent and not included in the optical amplifying apparatus 10. Further, in each of the aforementioned embodiments, the gain equalizer 22 was provided between the optical isolator 16 and the optical coupler 14, but, for example, it may be provided in a stage downstream of the optical coupler 14. Also, other configurations such as providing the gain equalizer 22 on an input side from EYDF with the EYDF being at the center, or dividing the EYDF into two and installing the gain equalizer 22 in the sublevel to achieve a higher output are conceivable.

Also, in the embodiment shown in FIG. 6, the description was made by taking a case in which the first embodiment shown in FIG. 1 was used as an optical amplifying apparatus as an example, but the optical amplifying apparatuses shown in FIGS. 7, 9, 10 and 11 may also be used.

Also, in each of the aforementioned embodiments, the case in which wavelength-division multiplexed optical signals in a C-Band is amplified was mainly explained, but it is also applicable for other wavelength-division multiplexed optical signals (e.g., S-Band or other) by adjusting the absorption-length product.

Also, in each of the aforementioned embodiments, the optical amplifying apparatus 10 was assumed to include only a booster amplifier, but, for example, in order to improve a NF (Noise Figure) which is a noise factor, for example, after having amplified with a preamplifier provided in a stage upstream of the booster amplifier, a further amplification may be carried out by the booster amplifier.

What is claimed is:

1. An optical amplifying apparatus that amplifies a wavelength-division multiplexed optical signal, comprising:
    an input section whereto the wavelength-division multiplexed optical signal is inputted;
    a laser light source that generates multimode laser light;
    a double-clad optical fiber having a cladding portion whereto the multimode laser light is inputted and a core portion doped with a rare-earth element whereto the wavelength-division multiplexed optical signal is inputted, the double-clad optical fiber amplifying optical signals of a plurality of wavelengths in the wavelength-division multiplexed optical signal by a stimulated emission by the multimode laser light;
    a gain equalizer that flattens a gain characteristic of the wavelength-division multiplexed optical signal that has been amplified by the double-clad optical fiber;
    an output section that outputs the amplified wavelength-division multiplexed optical signal; and
    a residual pump light attenuating section that attenuates a residual pump light outputted from the double-clad optical fiber,
    the residual pump light attenuating section being disposed in such a manner that the residual pump light of the multimode laser light which has propagated through the double-clad optical fiber is incident on the residual pump light attenuating section before being incident on an isolator,
    the residual pump light attenuating section including a residual pump light leakage portion that causes the residual pump light which has propagated through the cladding portion to leak out of the cladding portion, and a thermal conversion portion that converts a part of the leaked-out residual pump light into heat, a part of the residual pump light being outputted from the residual pump light attenuating section to be incident on the isolator.

2. An optical amplifying apparatus that amplifies a wavelength-division multiplexed optical signal, comprising:
an input section whereto the wavelength-division multiplexed optical signal is inputted;
a laser light source that generates multimode laser light;
a double-clad optical fiber having a cladding portion whereto the multimode laser light is inputted and a core portion doped with a rare-earth element whereto the wavelength division multiplexed optical signal is inputted, the double-clad optical fiber amplifying optical signals of a plurality of wavelengths in the wavelength-division multiplexed optical signal by a stimulated emission by the multimode laser light;
a gain equalizer that flattens a gain characteristic of the wavelength-division multiplexed optical signal that has been amplified by the double-clad optical fiber;
an output section that outputs the amplified wavelength-division multiplexed optical signal; and
a residual pump light attenuating section that attenuates a residual pump light outputted from the double-clad optical fiber,
the residual pump light attenuating section being disposed in such a manner that the residual pump light of the multimode laser light which has propagated through the double-clad optical fiber is incident on the residual pump light attenuating section before being incident on an optical component having an absorption characteristic in a pump light wavelength band,
wherein the residual pump light attenuating section includes a residual pump light leakage portion that causes the residual pump light which has propagated through the cladding portion to leak out of the cladding portion, and a thermal conversion portion that converts a part of the leaked-out residual pump light into heat,
a part of the residual pump light being outputted from the residual pump light attenuating section to be incident on the optical component.

3. The optical amplifying apparatus according to claim 2 wherein the optical component is constituted by magnetic garnet.

4. The optical amplifying apparatus according to claim 1 or 2 wherein the residual pump light leakage portion is an optical fiber that is connected to the double-clad optical fiber and has a core through which the wavelength-division multiplexed optical signal propagates and a cladding through which a residual pump light propagates, a periphery of the cladding being covered with a coating made of a material having a higher refractive index than that of the cladding.

5. The optical amplifying apparatus according to claim 1 or 2, further comprising a pump light mixer connected to the double-clad optical fiber,
the pump light mixer having a single mode fiber portion having a core through which the wavelength-division multiplexed optical signal propagates and a multimode fiber portion through which a residual pump light propagates,
the residual pump light attenuating section being disposed at an output end of the multimode fiber portion, the residual pump light attenuating section absorbing and thermally converting the residual pump light leaking out of the output end of the multimode fiber portion and externally dissipating heat.

6. The optical amplifying apparatus according to claim 1 or 2, wherein the core portion is co-doped with erbium and ytterbium serving as the rare-earth element.

7. The optical amplifying apparatus according to claim 6, wherein the double-clad optical fiber has an absorption-length product having a predetermined gain for all the wavelengths constituting the wavelength-division multiplexed optical signal, the absorption-length product being represented by a product of a length of the optical fiber and a peak value of an absorption coefficient in a predetermined wavelength band.

8. The optical amplifying apparatus according to claim 7, wherein the wavelength-division multiplexed optical signal is within a wavelength band of 1528-1570 nm.

9. The optical amplifying apparatus according to claim 7, wherein the multimode laser light is within a wavelength range of 910-960 nm.

10. The optical amplifying apparatus according to claim 7, wherein the double-clad optical fiber is configured in such a manner that an absorption-length product of the core portion of erbium is less than or equal to about 300 dB for a wavelength near 1535 nm.

11. The optical amplifying apparatus according to claim 10, wherein the double-clad optical fiber is configured in such a manner that an absorption-length product of the core portion of erbium is within a range of about 30-150 dB for a wavelength near 1535 nm.

12. The optical amplifying apparatus according to claim 7, wherein the double-clad optical fiber is configured in such a manner that an absorption-length product of the cladding portion of ytterbium is less than or equal about 20 dB for a wavelength near 915 nm.

13. An optical amplifying apparatus according to claim 12, wherein the double-clad optical fiber is configured in such a manner that an absorption-length product of the cladding portion of ytterbium is within a range of generally 0.9-9.5 dB for a wavelength near 915 nm.

14. An optical transmission system comprising:
a light transmitting apparatus that transmits a wavelength-division multiplexed optical signal;
an optical amplifying apparatus that amplifies the wavelength-division multiplexed optical signal, including an input section whereto the wavelength-division multiplexed optical signal is inputted, a laser light source that generates multimode laser light, a double-clad optical fiber having a cladding portion whereto the multimode laser light is inputted and a core portion doped with a rare-earth element whereto the wavelength-division multiplexed optical signal is inputted, the double-clad optical fiber amplifying optical signals of a plurality of wavelengths in the wavelength-division multiplexed optical signals by a stimulated emission by the multimode laser light, a gain equalizer that flattens gain characteristics of the wavelength-division multiplexed optical signals that have been amplified by the double-clad optical fiber, an output section that outputs the amplified wavelength-division multiplexed optical signal, and a residual pump light attenuating section that attenuates a residual pump light outputted from the double-clad optical fiber, the residual pump light attenuating section being disposed in such a manner that the residual pump light of the multimode laser light which has propagated through the double-clad optical fiber is incident on the residual pump light attenuating section before being incident on an isolator; and a light receiving apparatus that receives the wavelength-division multiplexed optical signal amplified by the optical amplifying apparatus, the residual pump light attenuating section including a residual pump light leakage portion that causes the residual pump light which has propagated through the cladding portion to leak out of the cladding portion, and a thermal conversion portion that converts a part of the leaked-out residual pump light into heat, a part of the residual pump light being outputted from the residual pump light attenuating section to be incident on the isolator.

* * * * *